(12) United States Patent
Foster

(10) Patent No.: US 8,994,700 B2
(45) Date of Patent: Mar. 31, 2015

(54) ARTIFACT-FREE TRANSITIONS BETWEEN DUAL DISPLAY CONTROLLERS

(76) Inventor: Mark J. Foster, Palo Alto, CA (US)

(*) Notice: Subject to any disclaimer, the term of this patent is extended or adjusted under 35 U.S.C. 154(b) by 2409 days.

(21) Appl. No.: 11/726,776

(22) Filed: Mar. 23, 2007

(65) Prior Publication Data

US 2007/0222774 A1 Sep. 27, 2007

Related U.S. Application Data (60) Provisional application No. 60/785,065, filed on Mar. 23, 2006, provisional application No. 60/906,122, filed on Mar. 9, 2007, provisional application No. 60/785,066, filed on Mar. 23, 2006.

(51) Int. Cl.
 *G09G 3/36* (2006.01)
 *G06F 3/038* (2013.01)
 *G09G 5/00* (2006.01)
 *G06F 3/14* (2006.01)

(52) U.S. Cl.
 CPC .......... *G06F 3/1431* (2013.01); *G09G 2360/04* (2013.01); *G09G 2360/18* (2013.01)
 USPC ................................ 345/204; 345/98; 345/99

(58) Field of Classification Search
 USPC ........................................... 345/98–100, 204
 See application file for complete search history.

(56) References Cited

U.S. PATENT DOCUMENTS

| | | | |
|---|---|---|---|
| 5,155,595 A | 10/1992 | Robison | |
| 5,757,365 A | 5/1998 | Ho | |
| 5,945,972 A * | 8/1999 | Okumura et al. | 345/98 |
| 6,333,750 B1 * | 12/2001 | Odryna et al. | 345/629 |
| 6,545,653 B1 * | 4/2003 | Takahara et al. | 345/87 |
| 6,624,816 B1 | 9/2003 | Jones | |
| 7,570,629 B1 | 8/2009 | McCormack et al. | |
| 7,624,142 B2 | 11/2009 | Jungck | |
| 2003/0084255 A1 * | 5/2003 | Suzuki et al. | 711/150 |
| 2003/0145108 A1 | 7/2003 | Joseph et al. | |
| 2003/0174723 A1 | 9/2003 | DeHon et al. | |

(Continued)

FOREIGN PATENT DOCUMENTS

| | | |
|---|---|---|
| CN | 1551098 | 12/2004 |
| JP | 11-507736 | 7/1999 |

(Continued)

OTHER PUBLICATIONS

JP Application No. 2007-77119, Current Claims as of Oct. 19, 2010, 9 pgs.

(Continued)

*Primary Examiner* — Temesgh Ghebretinsae
*Assistant Examiner* — Benyam Ketema
(74) *Attorney, Agent, or Firm* — Foley & Lardner LLP (57) ABSTRACT

A method, system and computer program product for driving a display device by a display system is provided. The display system includes a processor, a first display controller, a second display controller and the display device. The first display controller receives display frames that are sent by the processor. The first display controller drives the display device when the processor sends new display frames. When the same display frames are continually sent by the processor, the control of the display device is switched to the second display controller, which is optimized for low-power operation. The control of the display device is switched in proximity to an input vertical synchronization (V-sync) pulse.

25 Claims, 10 Drawing Sheets

(56) References Cited

U.S. PATENT DOCUMENTS

| | | | |
|---|---|---|---|
| 2003/0212830 A1 | 11/2003 | Greenblat et al. | |
| 2004/0117496 A1 | 6/2004 | Mittal et al. | |
| 2004/0125099 A1 | 7/2004 | Stanley et al. | |
| 2004/0217954 A1 | 11/2004 | O'Gorman et al. | |
| 2004/0252705 A1 | 12/2004 | Zancan et al. | |
| 2005/0268236 A1* | 12/2005 | Kosaka | 715/718 |
| 2006/0020715 A1 | 1/2006 | Jungck | |
| 2006/0101159 A1 | 5/2006 | Yeh et al. | |
| 2007/0110043 A1 | 5/2007 | Girard | |
| 2007/0159983 A1 | 7/2007 | Eglin et al. | |
| 2008/0043638 A1 | 2/2008 | Ribiere et al. | |
| 2008/0174601 A1* | 7/2008 | Kashi | 345/428 |
| 2008/0184042 A1 | 7/2008 | Parks et al. | |
| 2008/0285575 A1 | 11/2008 | Biswas et al. | |
| 2011/0001768 A1* | 1/2011 | Lin et al. | 345/698 |

FOREIGN PATENT DOCUMENTS

| | | |
|---|---|---|
| JP | 2004/288087 | 10/2004 |
| JP | 2005-338183 | 12/2005 |
| JP | 2007-179225 | 7/2007 |
| JP | 2007-293296 | 11/2007 |
| TW | 200513856 | 4/2005 |
| WO | WO 96/41253 | 12/2006 |

OTHER PUBLICATIONS

Taiwan Patent Office, "Notification for the opinion of examination (translation)", TW patent application No. 096110218, issued Sep. 6, 2010, 6 pages.

Claims, TW patent application No. 096110218, 8 pages.

Taiwan Patent Office, "Notification for the opinion of examination (translation)", TW patent application No. 096110222, issued Aug. 5, 2010, 9 pages.

Claims, TW patent application No. 096110222, 6 pages.

Chinese Patent Office, "Notification for the first opinion of examination (translated)", CN application No. 200780000458.5, dated Sep. 3, 2010, 11 pages.

Claims, CN patent application No. 200780000458.5, 6 pages.

State Intellectual Property Office of the People's Republic of China, "Notice of the Second Office Action" in application No. 200780000458.5, dated Jul. 29, 2011, 20 pages.

Current Claims In application No. 200780000458.5, dated Jul. 2011, 6 pages.

\* cited by examiner

ARTIFACT-FREE TRANSITIONS BETWEEN DUAL DISPLAY CONTROLLERS

CROSS-REFERENCE TO RELATED APPLICATIONS

This application claims the priority of U.S. Provisional Application Ser. No. 60/785,065, filed Mar. 23, 2006, titled, 'Artifact-Free Transitions Between Dual Display Controllers', and U.S. Provisional Patent Application No. 60/906, 122, filed Mar. 9, 2007, titled, 'Artifact-Free Transitions Between Dual Display Controllers' the disclosures of which are incorporated herein by reference for all purposes.

This application also incorporates by reference for all purposes, U.S. Provisional Patent Application No. 60/785,066, filed Mar. 23, 2006, titled, 'Self-Refreshing Display Controller for a Portable controller' and U.S. application Ser. No. 11/726,785, titled "Self-Refreshing Display Controller For Display Devices in a Computational Unit" filed concurrently herewith.

BACKGROUND

The present invention relates, in general, to display systems. More specifically, the present invention is a method and system for providing artifact-free transitions between dual display controllers.

In a typical display system, a display controller obtains an input signal from a processor such as a Central Processing Unit (CPU). The display controller processes the input signal and provides an output signal. Thereafter, the output signal drives a display device of the display system.

In a dual-display controller system, the two display controllers are usually referred as primary and secondary display controllers. The primary and secondary display controllers are individually controlled by the processor. The display device can be controlled by any of the two display controllers. The control of the display device can be switched between the primary and the secondary display controllers. However, switching the control of the display device between the primary and the secondary display controllers has to be synchronized to avoid any artifact on the display device.

There are various techniques for synchronizing the primary and secondary display controllers. In a conventional technique, known as 'Genlock', the primary and the secondary display controllers work simultaneously. Additionally, the output from the primary and the secondary display controllers is merged to form an image on the display device. However, this merging and synchronizing of outputs require expensive and complicated electronic systems.

According to other conventional techniques, synchronization of the primary and secondary display controllers is realized by transferring the display frames of the primary display controller to the secondary display controller. The display frames can be modified by either of the display controllers. This modification and transfer of display frames requires continual intervention of the processor.

However, conventional techniques suffer from one or more of the following shortcomings. These techniques require both the display controllers to run simultaneously and therefore, continual intervention of the processor is required. Consequently, power is used incessantly by the display system. There are some other conventional techniques that do not require continual intervention of the processor but are complex and expensive.

In light of the foregoing discussion, there is a need for a method that can synchronize the primary and the secondary display controllers and overcome the above-mentioned shortcomings. Further, there is a need for a method that requires minimal or no intervention of the processor. There is also a need for a method that can provide an artifact-free transition between the primary and secondary display controllers. Additionally, there is a need for a method that does not require expensive hardware and is ideal for use in a cost-sensitive display system. Moreover, there is a need for a method and system that consumes less power.

SUMMARY

An object of the present invention is to provide a method, system and computer program product for driving a display device by a display system.

Another object of the present invention is to provide a method, system and computer program product for driving a display device without continual intervention of the processor.

Another object of the present invention is to provide a method, system and computer program product for driving a display device by a display system which has less power consumption.

Yet another object of the present invention is to provide a method for transition of control between the first and second display controllers such that an artifact-free display is generated on the display device.

Still another object of the present invention is to eliminate the need for expensive and dedicated hardware, thereby making it ideal for use in cost-sensitive and power-sensitive applications.

In order to achieve the foregoing objectives, various embodiments of the present invention provide a method and system for driving a display device by a display system. The display system includes a processor, a first display controller, a second display controller, a frame buffer for first display controller, a frame buffer for second display controller and the display device. The processor sends display frames to the first display controller. The first display controller passes the display frames to the second display controller. The second display controller can either refresh the display device with the input display frames without performing any manipulations or refresh the display device after performing one or more manipulations.

The first display controller drives the display device if the processor writes display frames to the frame buffer of the first display controller. However, if no new frame is written to the frame buffer of the first display controller, the second display controller records the display frames into the frame buffer of the second display controller. Immediately after recording the display frame, the second display controller performs a transition from the video timings of the first display controller to the video timings of the second display controller. The transition of video timings is performed in proximity to the trailing edge of a Vertical Synchronization (V-Sync) pulse, i.e., during a vertical blanking interval. Following the video timings transition, the second display controller drives the display system. The processor and the first display controller can be switched to an inactive mode when the second display controller drives the display device.

The second display controller continues to drive the display device even if the processor does not write any frames to the frame buffer of the first display controller. When the second display controller refreshes the display device with the same display frame for a predetermined number of times, it can be switched to an inactive state. Whenever a frame is written to the frame buffer of the second display controller, the control is switched back from the second display controller to the first display controller in proximity to the trailing edge of a V-Sync pulse. In an embodiment of the present invention, the second display controller can be activated from an inactive mode whenever the processor receives an input from a number of input devices.

The second display controller performs all transitions such as the switching of controls between the first and the second display controllers in proximity to the trailing edge of the V-Sync pulse. This ensures that a complete frame is recorded prior to the switching of control, thereby producing an artifact-free display. Since the transfer and recording of display frames and switching of control occur automatically, the need for continual intervention of the processor is eliminated. The processor, the first display controller and the second display controller can be switched to a low-power mode to maximize power conservation. Accordingly, the embodiments of the present invention achieve the object of providing a less expensive, low-power consuming method and system for refreshing a display device.

BRIEF DESCRIPTION OF THE DRAWINGS

Various embodiments of the present invention will hereinafter be described in conjunction with the appended drawings, provided to illustrate and not to limit the present invention, wherein like designations denote like elements, and in which.

DETAILED DESCRIPTION OF VARIOUS EMBODIMENTS

Embodiments of the present invention provide a method, system and computer program product for driving a display device by a display system, wherein the display system is present in a computational device. The display system includes a processor, a first display controller, a second display controller, a frame buffer of the first display controller, a frame buffer of the second display controller, and the display device. The display device can be driven by either the first display controller or the second display controller. When the same frames are being written to the frame buffer of the first display controller, the control of the display device is switched from the first display controller to the second display controller. Following a trailing edge of an input Vertical Synchronization (V-Sync) pulse, the second display controller performs a transition of control of the display device from the first display controller to the second display controller. The switching of the control of the display device is performed during a vertical blanking interval that prevents display artifacts during the transition.

Alternatively, in another embodiment of the present invention, when new frames are written to the frame buffer of the first display controller, the control of the display device is switched to the first display controller from the second display controller. The switching of the control of the display device is performed during the vertical blanking interval.

Figure 1:
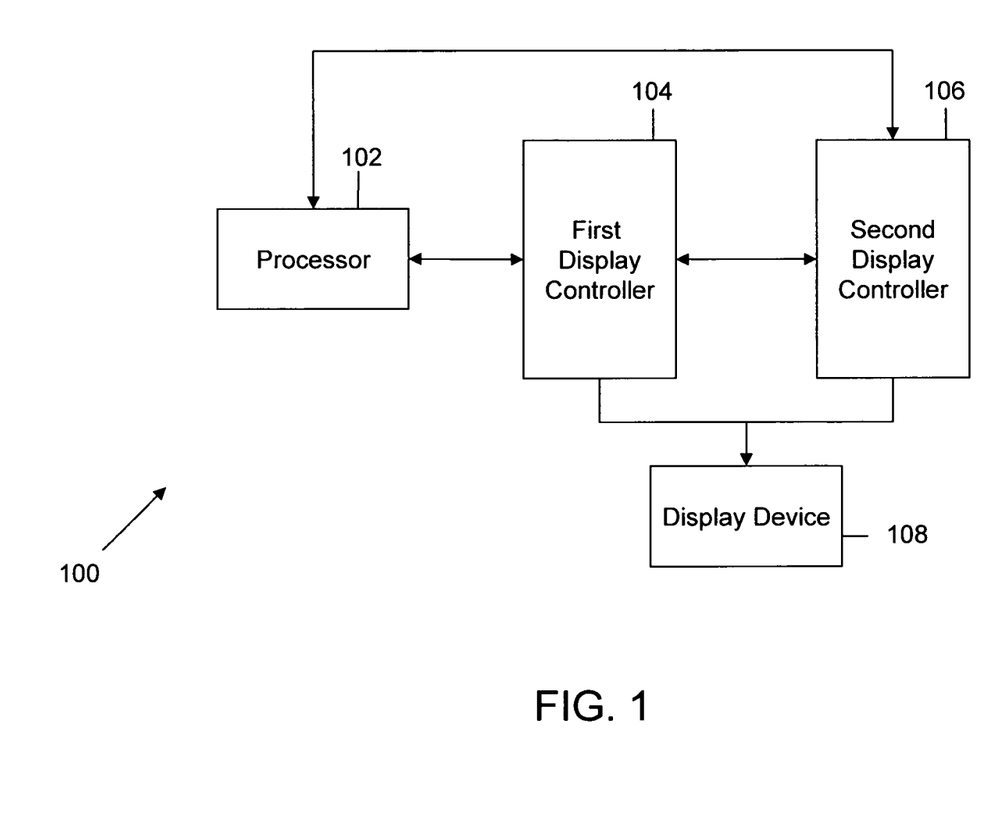
FIG. 1 is a schematic representation of an environment, in which various embodiments of the present invention can be practiced.

Referring to the drawings now, particularly by their reference numbers, FIG. 1 is a schematic representation of an environment 100, in which various embodiments of the present invention can be practiced. Environment 100 includes a number of computational devices. Further, a typical computational device includes a processor 102, a first display controller 104, a second display controller 106, and a display device 108. Processor 102 controls first and second display controllers 104 and 106, respectively. First display controller 104 can be integrated with processor 102. Alternatively, first display controller 104 can function distinctly from processor 102. Examples of computational devices include, but are not limited to, laptop computers, palmtop computers, desktop computers, calculators, mobile phones, and Personal Digital Assistants (PDAs). Examples of display devices 108 include, but are not limited to, Liquid Crystal Display (LCD) screens, Cathode Ray Tube (CRT) monitors and plasma screens. Processor 102 can be a typical Central Processing Unit (CPU) present in the computational device. Examples of first display controller 104 and second display controller 106 include, but are not limited to, a conventional Video Graphics Array (VGA) or other controllers and an Application Specific Integrated Controller (ASIC).

In an embodiment of the present invention, second display controller 106 preferably supports six interfaces. The first interface is a Thin Film Transistor (TFT) input port designed to accept display frames from first display controller 104. The second interface is a Double Edged Transistor-Transistor Logic (DETTL) LCD output port that connects directly to a TFT panel row and column driver of Integrated Circuits (ICs), supporting LCD display output on suitable TFT display devices. The third interface is a bi-directional System Management BUS (SMBUS) serial port. The SMBUS is of at least 100 KHz and is connected to second display controller 106's internal set up and configuration registers. The SMBUS port has the capability that can read and write to the internal set up and configuration registers of second display controller 106. The fourth interface is a group of one or more input/output pin interfaces for managing time critical switching between first display controller 104 and second display controller 106. The fifth interface is a Synchronous Dynamic Random Access Memory (SDRAM) interface port that communicates with a low-power SDRAM for storing one complete display frame. Second display controller 106 performs an autonomous refresh of display device 108 by fetching display frames from the SDRAM. The sixth interface is directly attached to a 14.31818 MHz crystal. The crystal is supported by an on-chip oscillator to provide an independent pixel clock for display refresh, regardless of the state of the display input port. The independent pixel clock for the display, running at 50 Hz, is synthesized at 57.27272 MHz. Additionally, the independent pixel clock provides the interface timing for the attached SDRAM frame buffer.

In accordance with another embodiment of the present invention, second display controller 106 includes a seventh interface with a number of pins connected to processor 102. The pins activate second display controller 106 from an inactive mode when processor 102 receives input from a number of input devices.

In addition, second display controller 106 possesses various capabilities. Second display controller 106 supports 'color swizzling' to enable display device 108 to appear as a conventional 24-bit panel. Color swizzling is a method for reducing the number of bits that represent each pixel without any visual difference in the display quality. Further, second display controller 106 supports an anti-aliasing capability. The anti-aliasing capability improves text display on display device 108. Moreover, second display controller 106 provides a monochrome mode support for converting pixel-addressable automatic color to gray scale.

Additionally, second display controller 106 provides transparency to incoming display frames in a pass-through mode. In the pass-through mode, second display controller 106 passes on the display frames to first display controller 104 without performing any manipulations. Consequently, a simple LCD timing controller chip and an automatic fly-by mode are emulated. The automatic fly-by mode prevents unnecessary writes to the SDRAM frame buffer, thereby reducing the total power consumed by the display system. This results in minimizing power consumption. Further, second display controller supports conventional Red Green Blue (RGB) DETTL panels for efficient debugging. Second display controller 106 also includes a self-test capability for production-line testing. Second display controller 106 can be configured such that it does not perform manipulations on the input display frames by enabling the pass-through mode. This feature of the second display controller 106 can be used for testing the second display controller 106 during production. The above-mentioned features of second display controller 106 are discussed in conjunction with FIG. 2.

Figure 2:
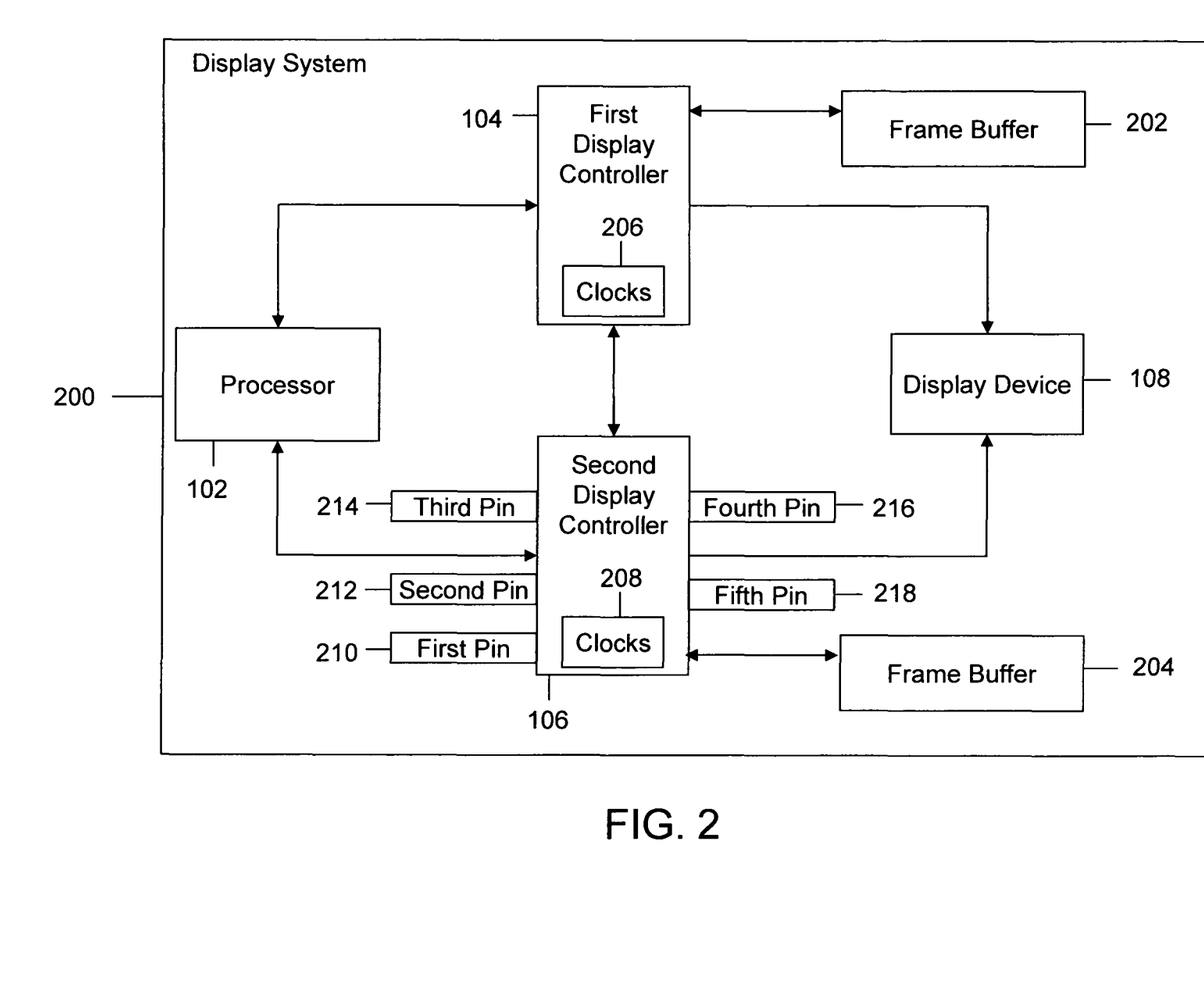
FIG. 2 is a schematic representation of system elements present in a display system, in accordance with an embodiment of the present invention.

FIG. 2 illustrates a schematic representation of system elements present in a display system 200 in accordance with an embodiment of the present invention. First display controller 104 includes a frame buffer 202 and a number of clocks. However, for the purpose of simplified representation, first display controller 104 is shown to include a clock 206. Further, first display controller includes one or more registers. In addition, second display controller 106 includes a frame buffer 204 and a number of clocks. However, for the purpose of simplified representation, second display controller 106 is shown to include a clock 208. Further, second display controller includes a first pin 210, a second pin 212, a third pin 214, a fourth pin 216, a fifth pin 218, and one or more registers.

Processor 102 provides display frames to first display controller 104 and second display controller 106 for refreshing display device 108. The display frames includes a number of display frames for refreshing display device 108. Display data includes one or more frames to be displayed by display device 108. A display frame is a pixel-by-pixel data of an image that is to be displayed on display device 108. Frame buffer 202 and frame buffer 204 store display frames for refreshing display device 108. Display device 108 can be driven either by first display controller 104 or second display controller 106. The pins are used to manage switching of the control of display device 108 between display controllers 104 and 106. Processor 102 provides display frames to first display controller 104. First display controller 104 refreshes display device 108 when processor 102 writes display frames to frame buffer 202. When processor 106 does not write to frame buffer 202, the control of display device 108 is switched to second display controller 106. When processor 102 writes to frame buffer 202 again, the control is switched back to first display controller 104. The transition of control of display device 108 between first display controller 104 and second display controller 106 may produce display artifacts. The method of switching the control of display device 108 without producing any artifacts is described in detail in conjunction with FIGS. 3, 4 and 5.

Figure 3:
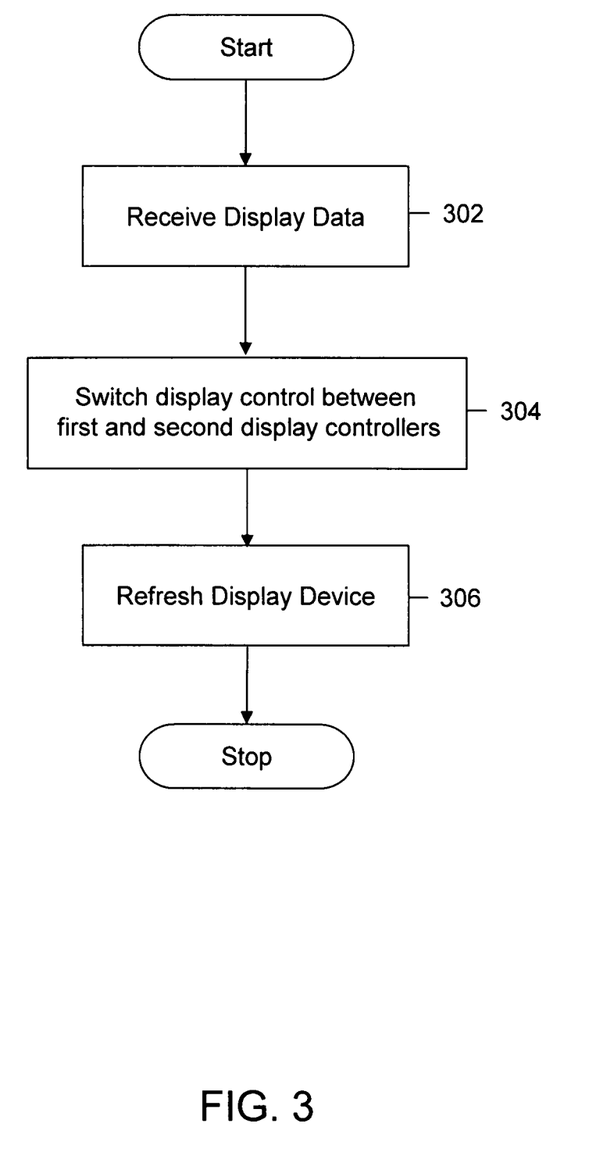
FIG. 3 is a flowchart of a method for driving a display device, in accordance with an embodiment of the present invention.

FIG. 3 is a flowchart of a method for driving display device 108, in accordance with an embodiment of the present invention. At step 302, display data is received at first display controller 104. First display controller 104 receives the display data from processor 102. The display data is stored in frame buffer 202.

At step 304, the control of display device 108 is switched between first display controller 104 and second display controller 106. The control of the display device is switched between first display controller 104 and second display controller 106 in a blanking interval. A blanking interval is the duration between the trailing edge of a Vertical Synchronization (V-Sync) or a Horizontal Synchronization (H-sync) pulse and the start of a next active scanline. A scanline represents a row of pixel data of the image that is to be displayed by display device 108. The blanking interval is a vertical blanking interval and the switching takes place at the end of an input vertical-synchronization (V-Sync) pulse.

In an embodiment, when first display controller 104 drives display device 108 and no display data is written to frame buffer 202, the control of display device 108 is switched from first display controller 104 to second display controller 106. In another embodiment of the present invention, when second display controller 106 drives display device 108 and new display frames are written to frame buffer 202, the control of display device 108 is switched from second display controller 106 to first display controller 104. At step 306, display device 108 is refreshed after the control is switched. The method of switching control of display device 108 between first display controller 104 and second display controller 106 is described in more detail in conjunction with FIGS. 4 and 5.

Figure 4A:
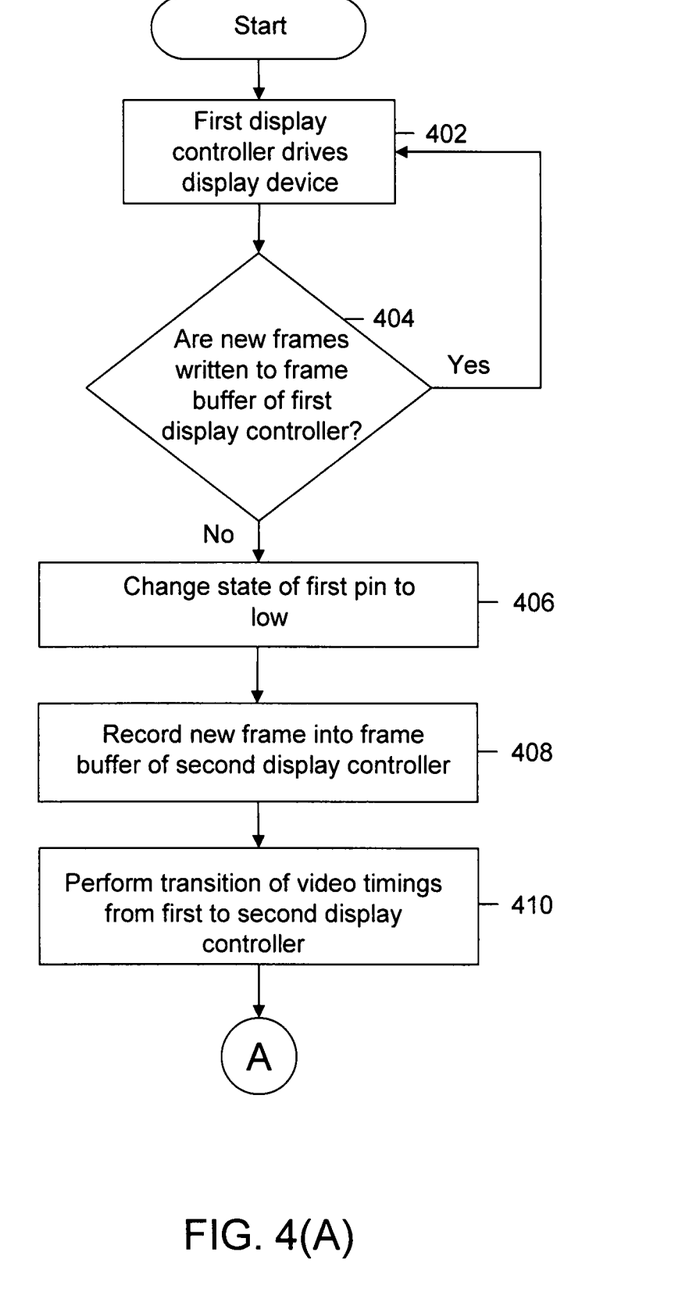
FIGS. 4A and 4B comprise a flowchart of a method for switching control of a display device from a first display controller to a second display controller, in accordance with an embodiment of the present invention.
Figure 4B:
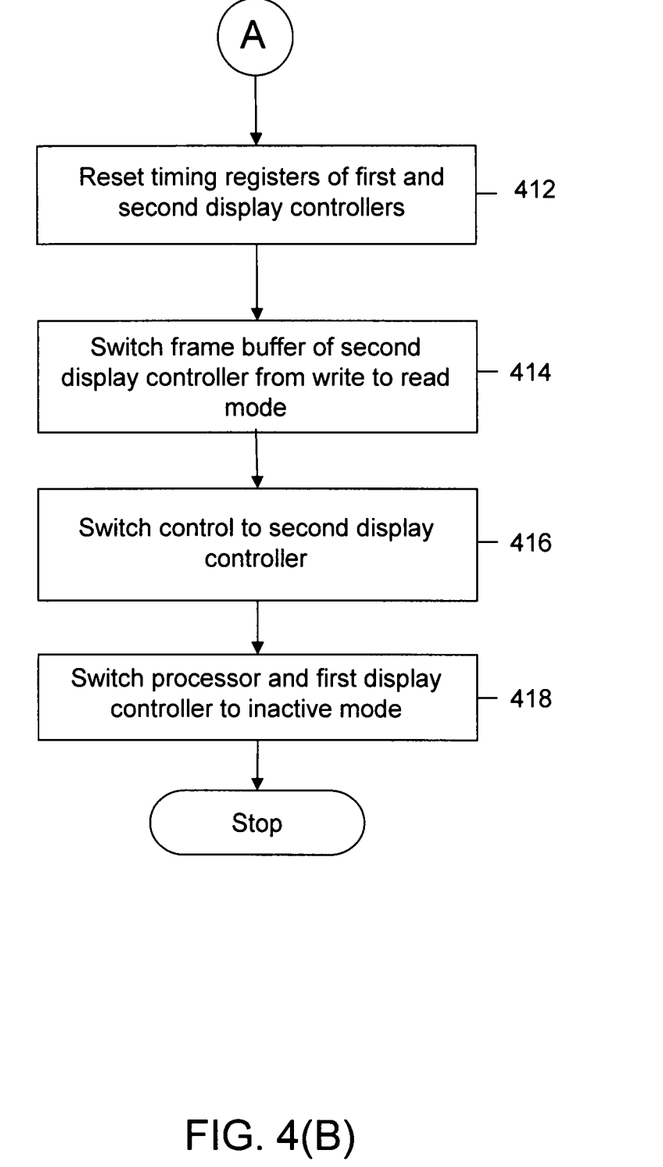

FIGS. 4A and 4B comprise a flowchart of a method for switching control of display device 108 from first display controller 104 to second display controller 106, in accordance with an embodiment of the present invention. When frame buffer 202 is written continuously with new display frames, first display controller 104 drives display device 108. First display controller 104 driving display device 108 includes passing the display frame to second display controller 106. Second display controller 106 records the display frame into frame buffer 204. Thereafter, second display controller 106 refreshes display device 108 by fetching the display frame from frame buffer 204. Second display controller 106 can perform one or more modifications to the display frame such as altering the frequency of the display outputs, performing color swizzling, performing color anti-aliasing functions. Thereafter, second display controller 106 refreshes display device 108.

In accordance with another embodiment of the present invention, second display controller 106 can perform modifications to the display frame and refresh display device 108 without recording the display frame to frame buffer 204.

At step 402, first display controller 104 drives display device 108. At step 404, it is determined whether new display frames are written to frame buffer 202. If new display frames are written to frame buffer 202, first display controller 104 continues to drive display device 108, at step 402. Alternatively, if no new display frame is written to frame buffer 202, then, at step 406, first pin 210 is set to a low state. At step 408, a new frame is recorded into frame buffer 204. Thereafter, second display controller 106 performs a display load cycle at the end of the V-Sync pulse. The process of performing a display load cycle includes recording a display frame into frame buffer 204. The recording of the display frame into frame buffer 204 commences at the trailing edge of the input V-Sync pulse and terminates at the trailing edge of the next V-Sync pulse. The trailing edge of the V-Sync pulse indicates the end of a current display frame and the initiation of a new display frame. Second display controller 106 starts recording the pixel data from the first scanline to the trailing edge of the next V-Sync pulse. The trailing edge of the input V-Sync pulse or display frame timing of second display controller 106 is indicated to processor 102 by second pin 212. Second pin 212 is maintained at a low state from the first output scanline up to the trailing edge of the V-Sync pulse.

Second pin 212 is maintained at a high state in the vertical blanking interval. Processor 102 uses the state of second pin 212 to synchronize the switching of the control of display device 108 between first display controller 104 and second display controller 106 during the vertical blanking interval. After the entire frame is recorded into frame buffer 204, second display controller 106 initiates the switching of control from first display controller 104 to itself.

At step 410, second display controller 106 performs a transition of a number of video timings of first display controller 104 to a number of video timings of second display controller 106. In accordance with an embodiment of the present invention, the transition of the video timings of first display controller 104 to second display controller 106 is performed in proximity to the trailing edge of the V-Sync pulse. Proximity to the trailing edge of the V-Sync pulse refers to the time interval from the start of the V-Sync pulse to the end of the ensuing vertical blanking interval. In addition, second display controller 106 performs a transition from clock 206 to clock 208. Clock 206 and clock 208 may be at the same frequency. However, clock 208 can run asynchronously to clock 206. In accordance with an embodiment of the present invention, 'First In First Out' (FIFO) can be used to revise the time of the display frames sent by first display controller 104 to match the video timings of second display controller 106. In another embodiment of the present invention, the transition of the video timings of first and second display controllers 104 and 106, respectively, is performed during the blanking interval of the horizontal synchronization (H-Sync) pulse. In accordance with another embodiment of the present invention, the synchronization of display frames can be performed by using a gated Phase Locked Loop (PLL) and therefore, can be rendered continually.

At step 412, second display controller 106 resets a number of registers of first display controller 104 and a number of registers of second display controller 106. At step 414, second display controller 106 switches frame buffer 204 from write mode to read mode. In an embodiment of the present invention, the switching of frame buffer 204 from write mode to read mode is performed simultaneously with the transition of the video timings. Following the transition of the video timings, second display controller 106 uses the registers and clock 208 to generate the display output. The display output includes the display frame that is fetched from frame buffer 204 with or without performing manipulations. The registers and clock 208 initiate operations at the start of the next active scan line following the transition of control of display device 108.

At step 416, the control of display device 108 is switched from first display controller 104 to second display controller 106. Thereafter, second display controller 106 starts refreshing display device 108 from the start of the next active scanline. Second display controller 106 autonomously refreshes display device 108 with the display frame present in frame buffer 204. At step 418, first display controller 104 and processor 102 are switched to an inactive mode. In accordance with another embodiment of the present invention, at step 418, first display controller 104 can be switched to an inactive mode while processor 102 continues to be in an active mode.

Second display controller 106 can be switched to an inactive mode when second display controller 106 refreshes display device 108 with the same display frame for a predetermined number of times. The predetermined number of times for refreshing display device 108 is stored in the registers of second display controller 106.

Figure 5:
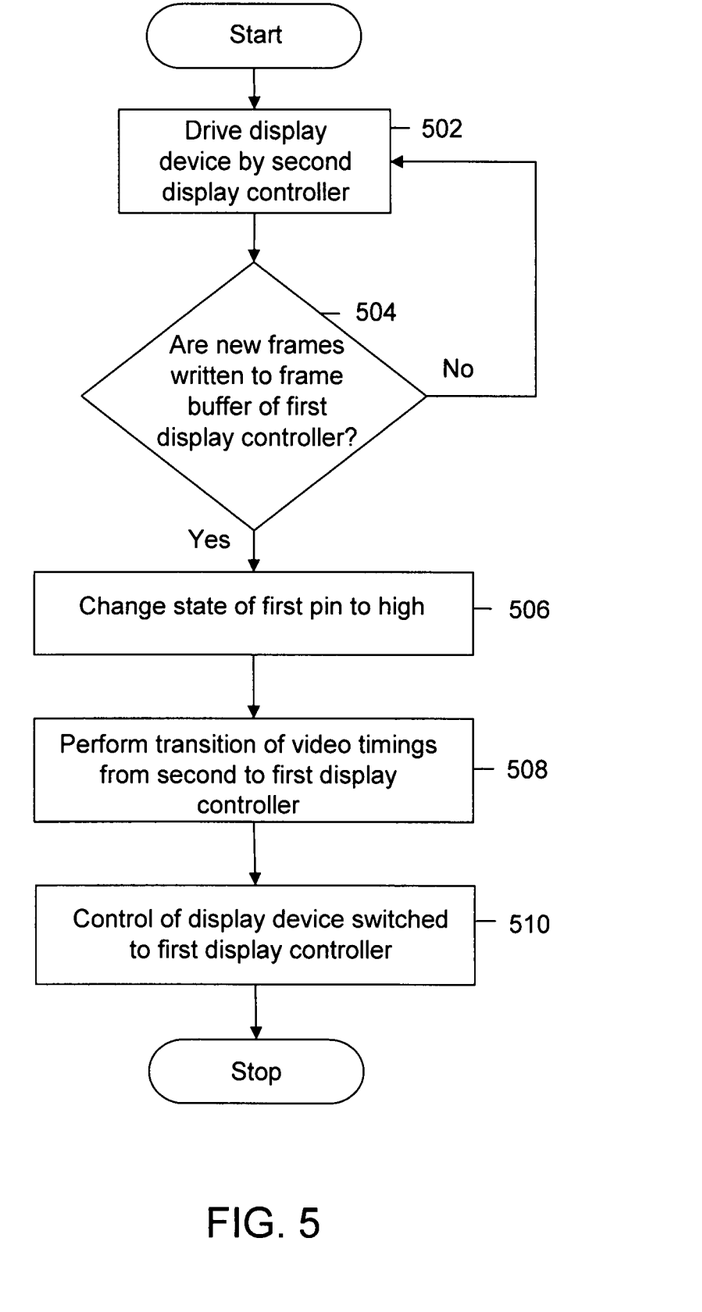
FIG. 5 is a flowchart of a method for switching control of a display device from a second display controller to a first display controller, in accordance with an embodiment of the present invention.

FIG. 5 illustrates a flowchart of a method for switching control of display device 108 from second display controller 106 to first display controller 104, in accordance with an embodiment of the present invention. At step 502, second display controller 106 drives display device 108. At step 504, it is determined whether new display frames are written to frame buffer 202. If no new display frames are written to frame buffer 202, second display controller continues to drive display device 108, at step 502. Alternatively, if a new display frame is written to frame buffer 202, then, at step 506, first pin 210 is set to a high state. The high state of first pin 210 indicates an intermediate high-power recording state of first display controller 104. The process of recording refers to loading the display frame from frame buffer 202 and storing it in frame buffer 204 by second display controller 106.

At step 508, second display controller 106 performs a transition between the video timings of second display controller 106 and the video timings of first display controller 104. Further, second display controller 106 performs a transition between clock 208 and clock 206. In an embodiment of the present invention, the clock transition is performed in proximity to the trailing edge of the input V-Sync pulse. Alternatively, in another embodiment of the present invention, the clock transition is performed during the blanking interval of the H-Sync pulse.

If first display controller 104 is in a low state, clock 206, the video timings and the registers of first display controller 104 are re-initialized by processor 102. Further, processor 102 synchronously re-initializes clock 206 with clock 208. In accordance with another embodiment of the present invention, the video timings, clock 206 and the registers of first display controller 104 can be re-initialized with the support of an interrupt serviced by third pin 214. Third pin 214 can service a scanline interrupt at the start of a pre-selected scanline. Second display controller 106 can be programmed to perform a number of functions depending on the type of the interrupt serviced. The type of the serviced interrupt is indicated to processor 102 by fourth pin 216. In accordance with another embodiment of the present invention, second display controller 106 uses a number of pins to indicate the type of serviced interrupt. Second display controller 106 performs a transition of control after the re-initialization of first display controller 104.

At step 510, the control of display device 108 is switched to first display controller 104. Thereafter, first display controller 104 drives display device 108 with the display frames written to frame buffer 202 by processor 102. From the following active scanline, the registers of first display controller 104 and clock 206 generate the display output.

Figure 6:
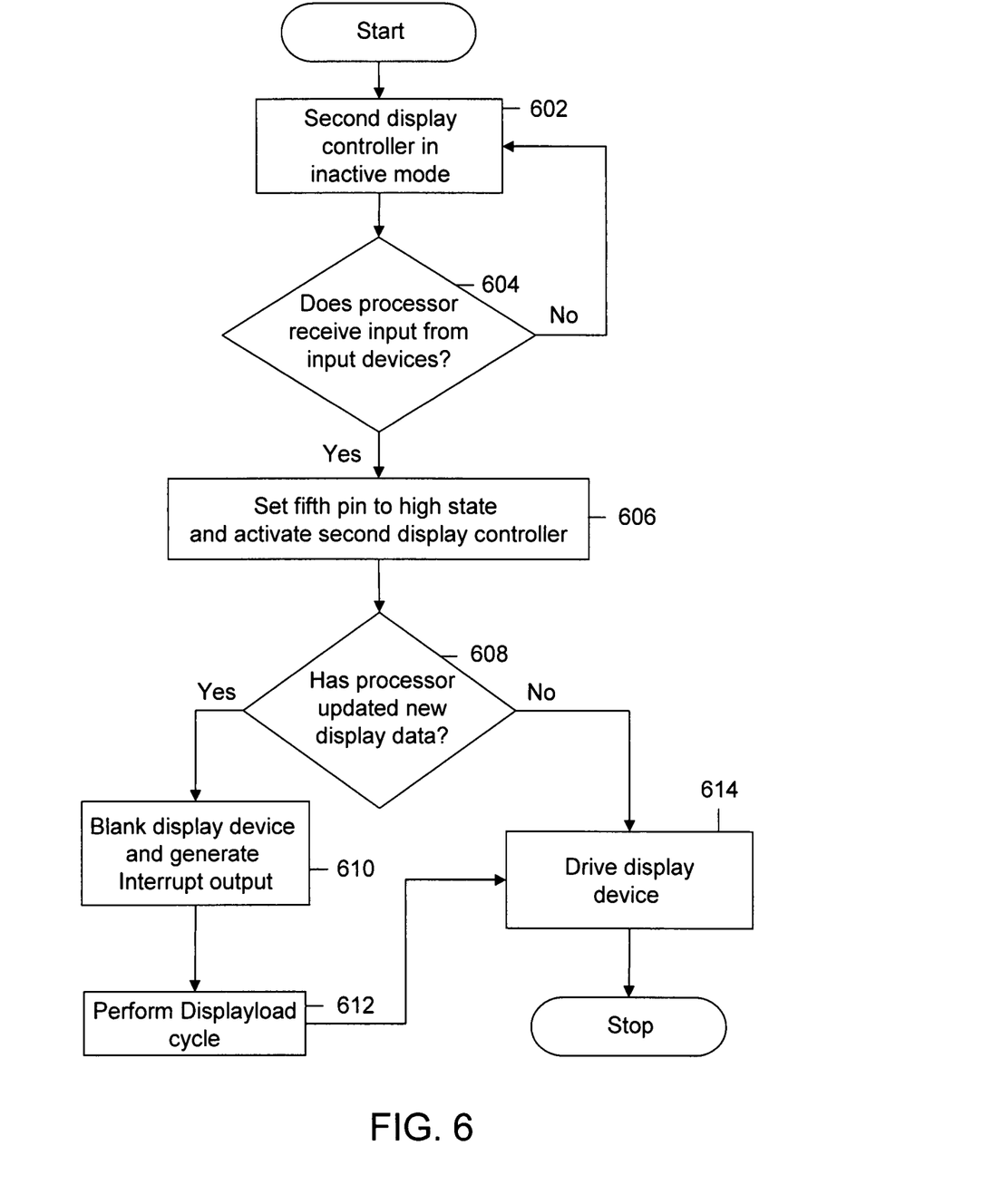
FIG. 6 is a flowchart of a method for activating a second display controller from an inactive mode, in accordance with an embodiment of the present invention.

FIG. 6 is a flowchart of a method for activating second display controller 106 from an inactive mode, in accordance with an embodiment of the present invention. At step 602, second display controller 106 remains in an inactive mode. At step 604, it is determined whether processor 102 receives an input from input devices associated with processor 102. The input devices can be, for example, a keyboard, a touchpad, a wireless event, a cursor pad or a mouse. If processor 102 does not receive the input, then, at step 602, second display controller 106 continues to remain in the inactive mode. However, if processor 102 receives the input, then, at step 606, fifth pin 218 is set to a high state and second display controller 106 is activated from an inactive mode. Fifth pin 218 is set to the high state by processor 102. When fifth pin 218 is set to the high state and second display controller 106 is in an active mode, second display controller 106 resets the display timeout registers. Display timeout registers store the value of the number of times a display frame can be refreshed by second display controller 106 after which second display controller 106 can be switched to an inactive mode. In accordance with another embodiment of the present invention, second display controller 106 is activated from the inactive mode by embedded software in processor 102, whenever processor 102 receives input from the input devices.

At step 608, it is determined whether processor 102 has updated frame buffer 202 with a new display frame. If processor 102 does not update a new frame, then, at step 614, second display controller 106 starts refreshing display device 108 autonomously with the display frame being present in frame buffer 204. However, if processor 102 updates frame buffer 202 with a new display frame, then second display controller 106 activates display device 108 and blanks the display by resetting display blanking registers. Display blanking registers control the functioning of display device 108. When the display blanking registers are enabled, second display controller 106 shows a blank display device 108. Resetting the display blanking registers reinstates normal functioning of display device 108. At step 610, third pin 214 generates an interrupt to instruct second display controller 106 to perform the display load cycle. At step 612, second display controller 106 performs the display load cycle. Thereafter, at step 614, second display controller starts refreshing display device 108 autonomously. The method steps involved in driving display device 108 and the states of the system elements of display system 200 with respect to time are described in detail in conjunction with FIGS. 7, 8 and 9.

Figure 7:
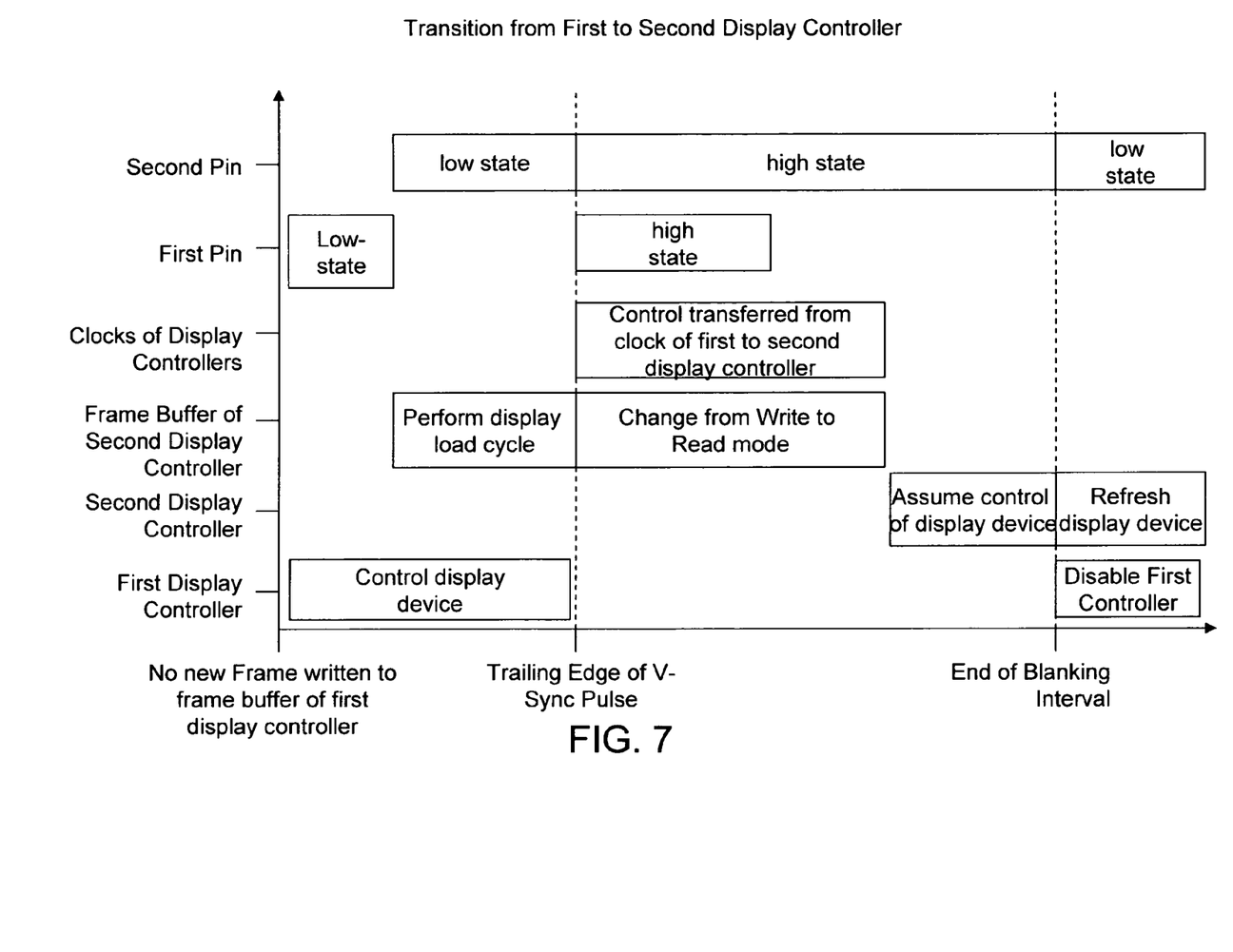
FIG. 7 is a timeline graph for switching control of a display device from a first display controller to a second display controller, in accordance with an embodiment of the present invention.

FIG. 7 is a timeline graph for switching control of display device 108 from first display controller 104 to second display controller 106, in accordance with an embodiment of the present invention. FIG. 7 illustrates the process of switching control of display device 108 that is performed during the vertical blanking interval. Further, the figure describes the states of different system elements of display system 200 with respect to time. The system elements of display system 200 illustrated FIG. 7 include first display controller 104, second display controller 106, frame buffer 204, clock 206, first pin 210 and second pin 212. In FIG. 7, time is represented on the x-axis and the states of the system elements are represented on the y-axis.

Figure 8:
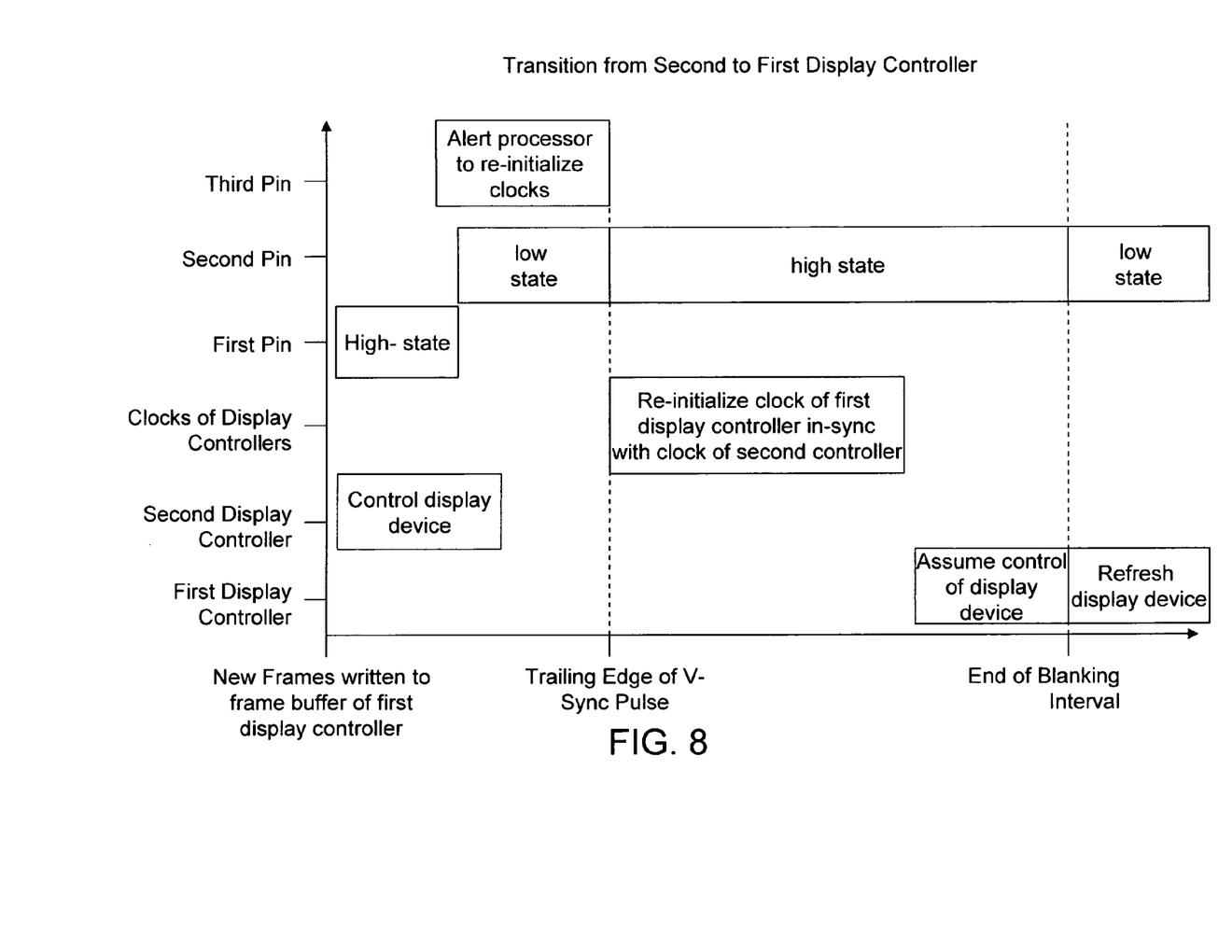
FIG. 8 is a timeline graph for switching control of a display device from a second display controller to a first display controller, in accordance with an embodiment of the present invention.

FIG. 8 is a timeline graph for switching control of display device 108 from second display controller 106 to first display controller 104, in accordance with an embodiment of the present invention. FIG. 8 illustrates the process of switching control of display device 108 being performed during the vertical blanking interval. Further, FIG. 8 describes the states of different system elements of display system 200, with respect to time. The system elements of display system 200 that have been illustrated in FIG. 8 include first display controller 104, second display controller 106, clock 206, first pin 210, second pin 212 and third pin 214. In FIG. 8, the time is represented on the x-axis and the states of the system elements are represented on the y-axis.

Figure 9:
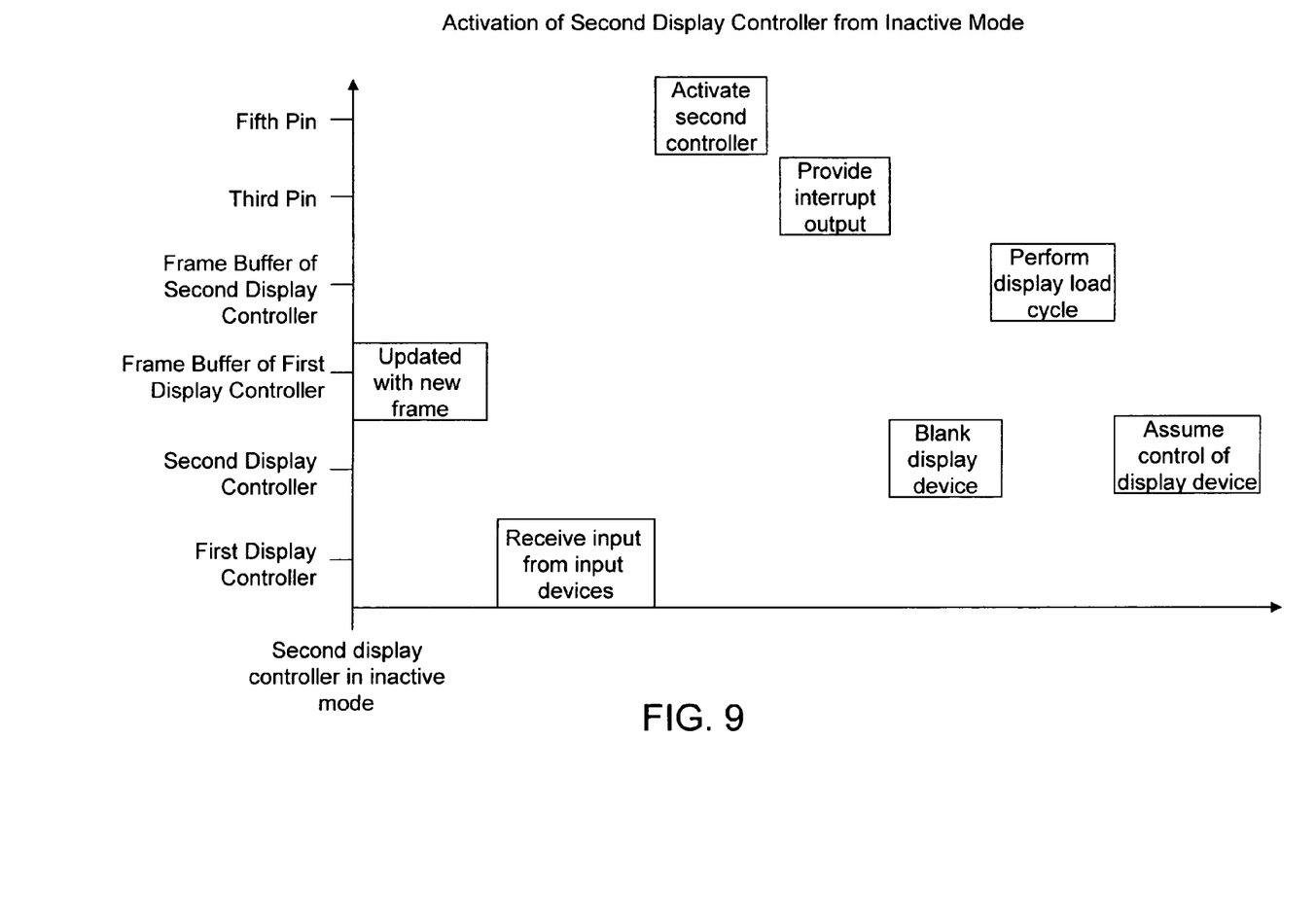
FIG. 9 is a timeline graph for activating a second display controller from an inactive mode, in accordance with an embodiment of the present invention.

FIG. 9 is a timeline graph for activating second display controller 106 from an inactive mode, in accordance with an embodiment of the present invention. FIG. 9 describes the states of different elements of display system 200 with respect to time. The system elements of display system 200 include first display controller 104, second display controller 106, frame buffer 202, frame buffer 204, third pin 214 and fifth pin 218. In FIG. 9, time is represented on the x-axis and the states of the system elements are represented on the y-axis.

The display controllers may, by way of example, be implemented with Application Specific Integrated Circuits (ASIC's), Programmable Logic Controllers (PLC's) and the like in portable devices. In light of the explanation given above, industry-based implementation details of the invention (secondary display controller 106), in accordance with an embodiment, are included herewith. These details include various hardware implementation details including the configuration level details of various processors, ICs, pins, and registers. The explanation will be appreciated by a person who is of ordinary skill in the art and will assist in implementing the invention without undue experimentation.

| Second display controller 106 REGISTER DEFINITIONS | | |
|---|---|---|
| REGISTER | INDEX | DEFAULT |
| Second display controller 106 ID & Revision | 0 | DC01H |
| Second display controller 106 Display Mode | 1 | 0012H |
| Horizontal Resolution | 2 | 0458H (1200 Decimal) |
| Horizontal Total | 3 | 04E8H (1256 Decimal) |
| Horizontal Sync | 4 | 1808H (24, 8 Decimal) |
| Vertical Resolution | 5 | 0340H (900 Decimal) |
| Vertical Total | 6 | 0390H (912 Decimal) |
| Vertical Sync | 7 | 0403H (4, 3 Decimal) |
| Display Timeout | 8 | FFFFH |
| Scanline Interrupt | 9 | 0000H |
| Backlight Brightness | 10 | XXXFH |
| Reserved | 11-127 | |

| Secondary display controller 106 USER I/O PIN DEFINITIONS Secondary display controller 106 ASIC Pinout - 1M (512K × 16) SDRAM Configuration | | |
|---|---|---|
| Geode Display Interface Pins | | |
| Geode Pixel Clock | GFDOTCLK | 1 |
| Geode Red Data | GFRDAT0-5 | 6 |
| Geode Green Data | GFGDAT0-6 | 7 |
| Geode Blue Data | GFBDAT0-5 | 6 |
| Geode VSync | GFVSYNC | 1 |
| Geode HSync | GFHSYNC | 1 |
| Geode FP_LDE | GFP_LDE | 1 |
| Interface Pins for 512K × 16 SDRAM | | |
| FBRAM Data | FBD0-15 | 16 |
| FBRAM Address | FBDA0-10 | 11 |

-continued

Secondary display controller 106 USER I/O PIN DEFINITIONS
Secondary display controller 106 ASIC Pinout - 1M (512K × 16)
SDRAM Configuration

| | | |
|---|---|---|
| FB Column Addr Strobe | FBCAS/ | 1 |
| FB Row Addr Strobe | FBRAS/ | 1 |
| FB Data Masks | FBDM0-1 | 2 |
| FBRAM Chip Select | FBCS/ | 1 |
| FBRAM Write Enable | FBWE/ | 1 |
| FBRAM Clock | FBCLK | 1 |
| FBRAM Clock Enable | FBCLKE | 1 |
| Crystal for secondary display controller 106 Self-Refresh | | |
| Display XTAL In | DCONXI | 1 |
| Display XTAL Out | DCONXO | 1 |
| System Interface Pins | | |
| System Reset | RESET | 1 |
| EC Power On Request | ECPWRRQST | 1 |
| secondary display controller 106 Interrupt Output | DCONIRQ/ | 1 |
| secondary display controller 106 Display Load Command Request | DCONLOAD | 1 |
| secondary display controller 106 Status Pins | DCONSTAT | 2 |
| secondary display controller 106 Blanking Status | DCONBLNK | 1 |
| secondary display controller 106 Register I/O SMB Clock | DCONSMBCLK | 1 |
| secondary display controller 106 Register I/O SMB Data | DCONSMBDATA | 1 |
| DETTL/Panel Interface Pins | | |
| Panel Pixel Data 0 | DO00-DO01 | 3 |
| Panel Pixel Data 1 | DO10-DO11 | 3 |
| Panel Pixel Data 2 | DO20-DO21 | 3 |
| Source Dot Clock | SCLK | 1 |
| Data Interface Polarity Control | REV1-2 | 2 |
| Graphics Output Enable (Gate driver enable) | GOE | 1 |
| ??? | INV | 1 |
| ??? | CPV | 1 |
| ??? | STV | 1 |
| ??? | FSTH | 1 |
| ??? | BSTH | 1 |
| ??? | TP | 1 |
| LCD Backlight Enable | BACKLIGHT | 1 |
| Display Backlight Control (PWM) | DBC | 1 |
| Driver Polarity Signal 1 | POL1 | 1 |
| LCD VDD Enable | VDDEN | 1 |
| Burn-In/Test Mode | AGMODE | 1 |
| Color/Monochrome Panel Bias Select | COLMODE | 1 |
| Total User I/Os | | 94 |

The minimum duty cycle of ECPWRRQST active is ~100 nS. (This pin need not be debounced or filtered.)

Various embodiments of the present invention provide a display system that includes a display device, a processor, a first display controller, a second display controller, and frame buffers, clocks of the first and the second display controllers. Further, the second display controller includes a number of pins.

Various embodiments of the present invention ensure that an artifact-free display is produced in the display system. The display is produced on the display device after the transition between the first display controller and the second display controller in the display system. The transition is performed in proximity to a trailing edge of a vertical synchronization (V-Sync) pulse, i.e., during a vertical blanking interval, thereby ensuring an artifact-free display.

The second display controller can refresh the display device autonomously, independent of the processor and the first display controller. The autonomous refresh of the display device eliminates the need for continual intervention of the processor.

The first and the second display controllers and the display device can be turned off on prolonged inactivity, resulting in significant saving of power consumption by the display system.

Various embodiments of the present invention do not require dedicated and expensive hardware and therefore, provide an ideal system for use in electronic devices in cost-sensitive and power-sensitive applications.

While the preferred embodiments of the present invention have been illustrated and described, it will be clear that the present invention is not limited to these embodiments only. Numerous modifications, changes, variations, substitutions and equivalents will be apparent to those skilled in the art without departing from the spirit and scope of the present invention, as described in the claims.

What is claimed is:

1. A method for driving a display device by a display system, the display system comprising the display device, a first display controller, a second display controller and a processor, the second display controller being optimized for low-power operation, the method comprising the steps of:
   receiving display data from the processor, the display data being received at the first display controller;
   switching control of the display device between the first display controller and the second display controller, the control of the display device being switched in proximity to a trailing edge of an input vertical synchronization (V-sync) pulse; and
   refreshing the display device, the display device being refreshed by the second display controller with a clock independent of the processor and the first display controller.

2. The method of claim 1, wherein the step of switching the control of the display device comprises the step of setting a first pin of the second display controller to a low state when no new frame is written to a frame buffer of the first display controller.

3. The method of claim 2, wherein the step of setting the first pin to the low state comprises the step of performing a display load cycle, the step of performing the display load cycle comprising storing a frame into a frame buffer of the second display controller, the storing of the frame being commenced at the trailing edge of the input V-sync pulse.

4. The method of claim 1, wherein the step of switching the control of the display device comprises the step of setting a first pin of the second display controller to a high intermediate state when one or more new frames are written to a frame buffer of the first display controller, the high intermediate state of the first pin indicating an intermediate high-power recording state.

5. The method of claim 1, wherein the step of switching the control of the display device comprises the step of performing a transition between one or more video timings of the first display controller and one or more video timings of the second display controller.

6. The method of claim 5, wherein the step of performing the transition comprises synchronously re-initializing the one or more video timings of the first display controller and the second display controller, the one or more video timings being synchronously re-initialized during a blanking interval.

7. The method of claim 5, wherein the step of switching the control of the display device further comprises the step of switching a frame buffer of the second display controller from a write mode to a read mode.

8. The method of claim 5, wherein the step of switching the control of the display device further comprises the step of communicating frame timing from the second display controller to the processor, the step of communicating comprises the steps of:
  setting a second pin of the second display controller to a low state at a pre-determined point prior to the V-sync pulse; and
  setting the second pin to a high state during a blanking interval, the blanking interval being an interval between the trailing edge of the V-sync pulse and the start of a new active scanline.

9. The method of claim 5, wherein the step of switching the control of the display device further comprises the step of servicing one or more types of scanline interrupts, each type of scanline interrupt having a timing relative to a pre-selected scanline, each type of scanline interrupt being serviced by a third pin of the second display controller, and the type of the scanline interrupt being indicated by a fourth or more pins of the second display controller.

10. The method of claim 9, wherein the step of servicing the one or more types of scanline interrupts further comprises the step of disabling the first display controller on the basis of the type of the scanline interrupt.

11. The method of claim 9, wherein the step of servicing the one or more types of scanline interrupt further comprises the step of alerting the processor to re-initialize the one or more video timings of the first display controller synchronously with the one or more video timings of the second display controller, the re-initialization being performed on the basis of the type of the scanline interrupt.

12. The method of claim 5, wherein the step of switching the control of the display device further comprises the step of driving the second display controller to an inactive mode based on the value of the one or more registers of the second display controller.

13. The method of claim 1, wherein the step of refreshing the display device comprises the step of activating the second display controller from an inactive mode, the second display controller being activated by the processor when the processor receives an input from one or more input devices.

14. The method of claim 1, wherein the step of refreshing the display device comprises the steps of:
  setting a fifth pin of the second display controller to a high state from a low state, the fifth pin being set when the processor receives an input from one or more input devices;
  activating the second display controller from an inactive mode.

15. The method of claim 1, wherein the step of refreshing the display device comprises commanding the first display controller to activate one or more video outputs when one or more new frames are written to a frame buffer of the first display controller.

16. The method of claim 1, wherein the step of refreshing the display device comprises autonomously driving the display device by the second display controller when no new frame is written to a frame buffer of the first display controller.

17. A system for driving a display device by a display system, the display system comprising the display device, a first display controller, a second display controller and a processor, the second display controller being optimized for low-power operation, the system comprising:
  means for communicating display data of the first display controller to the second display controller;
  means for switching control of the display device between the first display controller and the second display controller, the control of the display device being switched in proximity to the trailing edge of an input vertical synchronization (V-sync) pulse; and
  means for refreshing the display device, the display device being refreshed by the second display controller with a clock independent of the processor and the first display controller.

18. A non-transitory machine-readable storage medium comprising one or more machine-executable instructions for programming a processor in a display system, the display system including a display device, a first display controller, a second display controller and a processor, to perform a method, the method comprising the steps of:
  receiving display data, the display data being received at the first display controller from the processor, the first display controller present in the display system;
  switching control of the display device between the first display controller and the second display controller, the control of the display device being switched in proximity to a trailing edge of an input vertical synchronization (V-sync) pulse, the second display controller being present in the display system; and
  refreshing the display device, the display device being refreshed by the second display controller with a clock independent of the processor and the first display controller.

19. A system, comprising:
  a display system, the display system comprising a display device, a first display controller, a second display controller and a processor, the second display controller being optimized for low-power operation;
  wherein the display system is configured to perform:
  receiving display data from the processor, the display data being received at the first display controller;
  switching control of the display device between the first display controller and the second display controller, the control of the display device being switched in proximity to a trailing edge of an input vertical synchronization (V-sync) pulse; and
  refreshing the display device, the display device being refreshed by the second display controller with a clock independent of the processor and the first display controller.

20. The system of claim 19, wherein the display system is configured to further perform storing a frame into a frame buffer of the second display controller, the storing of the frame being commenced at the trailing edge of the input V-sync pulse.

21. The system of claim 19, wherein the display system is configured to further perform a transition between one or more video timings of the first display controller and one or more video timings of the second display controller.

22. The system of claim 21, wherein the display system is configured to further perform synchronously re-initializing the one or more video timings of the first display controller and the second display controller, the one or more video timings being synchronously re-initialized during a blanking interval.

23. The system of claim 19, wherein the display system is configured to further perform activating the second display controller from an inactive mode, the second display controller being activated by the processor when the processor receives an input from one or more input devices.

24. The system of claim 19, wherein the display system is configured to further perform commanding the first display controller to activate one or more video outputs when one or more new frames are written to a frame buffer of the first display controller.

25. The system of claim 19, wherein the display system is configured to further perform autonomously driving the display device by the second display controller when no new frame is written to a frame buffer of the first display controller.

* * * * *